United States Patent [19]
Malosh et al.

[11] Patent Number: 5,784,946
[45] Date of Patent: Jul. 28, 1998

[54] VACUUM BRAKE BOOSTER

[75] Inventors: James B. Malosh, Boroda, Mich.; Rolf Viebach; Dave C. Yoder, both of South Bend, Ind.

[73] Assignee: Robert Bosch Technologies Corporation, Broadview, Ill.

[21] Appl. No.: 897,875

[22] Filed: Jul. 21, 1997

Related U.S. Application Data

[63] Continuation-in-part of Ser. No. 753,071, Nov. 20, 1996.

[51] Int. Cl.$^6$ ........................................ F15B 9/10
[52] U.S. Cl. ................... 91/376 R; 181/207; 92/169.1
[58] Field of Search ..................... 91/376 R; 92/169.1; 181/207, 208, 209

[56] References Cited

U.S. PATENT DOCUMENTS

| | | | |
|---|---|---|---|
| 3,160,549 | 12/1964 | Caldwell et al. | 181/207 |
| 3,727,516 | 4/1973 | Myers et al. | |
| 4,574,455 | 3/1986 | Kytta. | |
| 4,683,807 | 8/1987 | Nishii et al. | 92/169.1 |
| 4,953,446 | 9/1990 | Fecher et al. | |
| 5,024,304 | 6/1991 | Booten et al. | 91/376 R |
| 5,249,505 | 10/1993 | Hewitt. | |

FOREIGN PATENT DOCUMENTS

| | | | |
|---|---|---|---|
| 2 516 880 | 11/1982 | France. | |
| 11860 | 5/1994 | WIPO | 181/208 |

OTHER PUBLICATIONS

Brochure entitled "Foam Materials" by Stephenson & Lawyer Inc.

Mardi C. Hastings "Damping and Stiffness characteristics of Sticky Steel" May 21, 1996 disclosed by Owens—Corning Fiberglass Granville, Ohio.

*Primary Examiner*—F. Daniel Lopez
*Attorney, Agent, or Firm*—Lee H. McCormick, Jr.; Warren Comstock

[57] ABSTRACT

A vacuum brake booster having sound absorbing members affixed to the front and rear shells to attenuate sounds caused by air movement in the brake booster. The front shell is joined to the rear shell to define the housing for the brake booster. The housing is divided into a first chamber and a second chamber by a wall structure. The first and second chambers in a first mode of operation are designed to be in communication with a first source of fluid (vacuum) having a first fluid pressure while in a second mode of operation the second chamber is in communication with a second source of fluid (atmospheric air) at a second fluid pressure. In the second mode of operation, a pressure differential is created across the wall structure to produce an output force corresponding to an input force associated with a desired braking application. A first sound absorbing member is affixed to rear shell for attenuating sounds produced by the communication of the second source of fluid in the second mode of operation while a second sound absorbing member is affixed to the front shell for attenuating sounds produced by the evacuation of the second source of fluid from the second chamber to return to the first mode of operation.

18 Claims, 3 Drawing Sheets

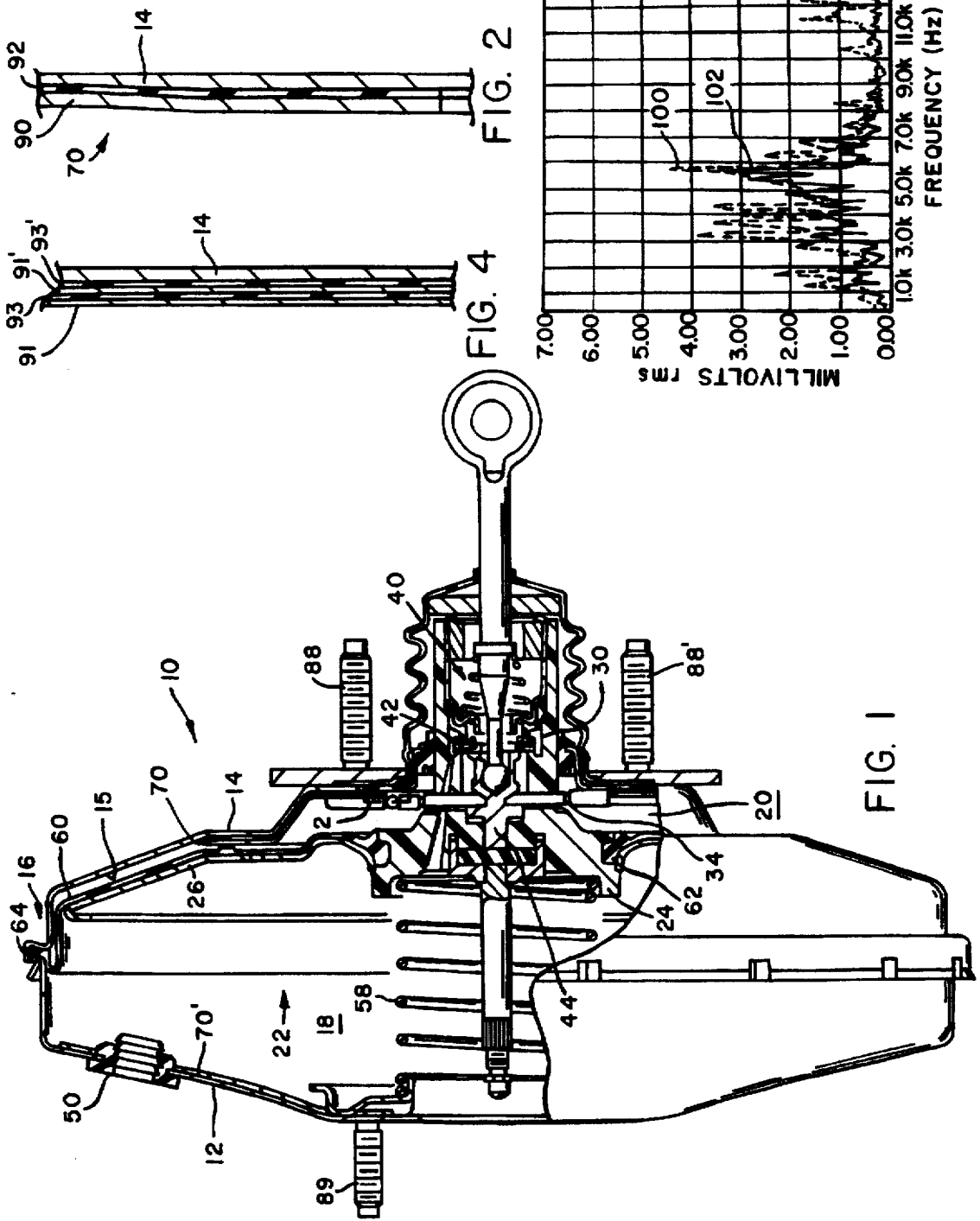

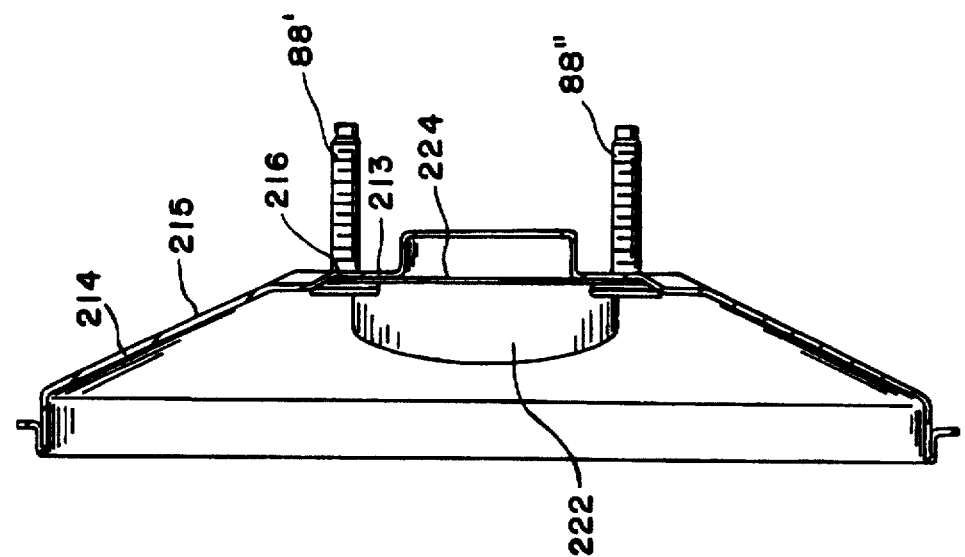
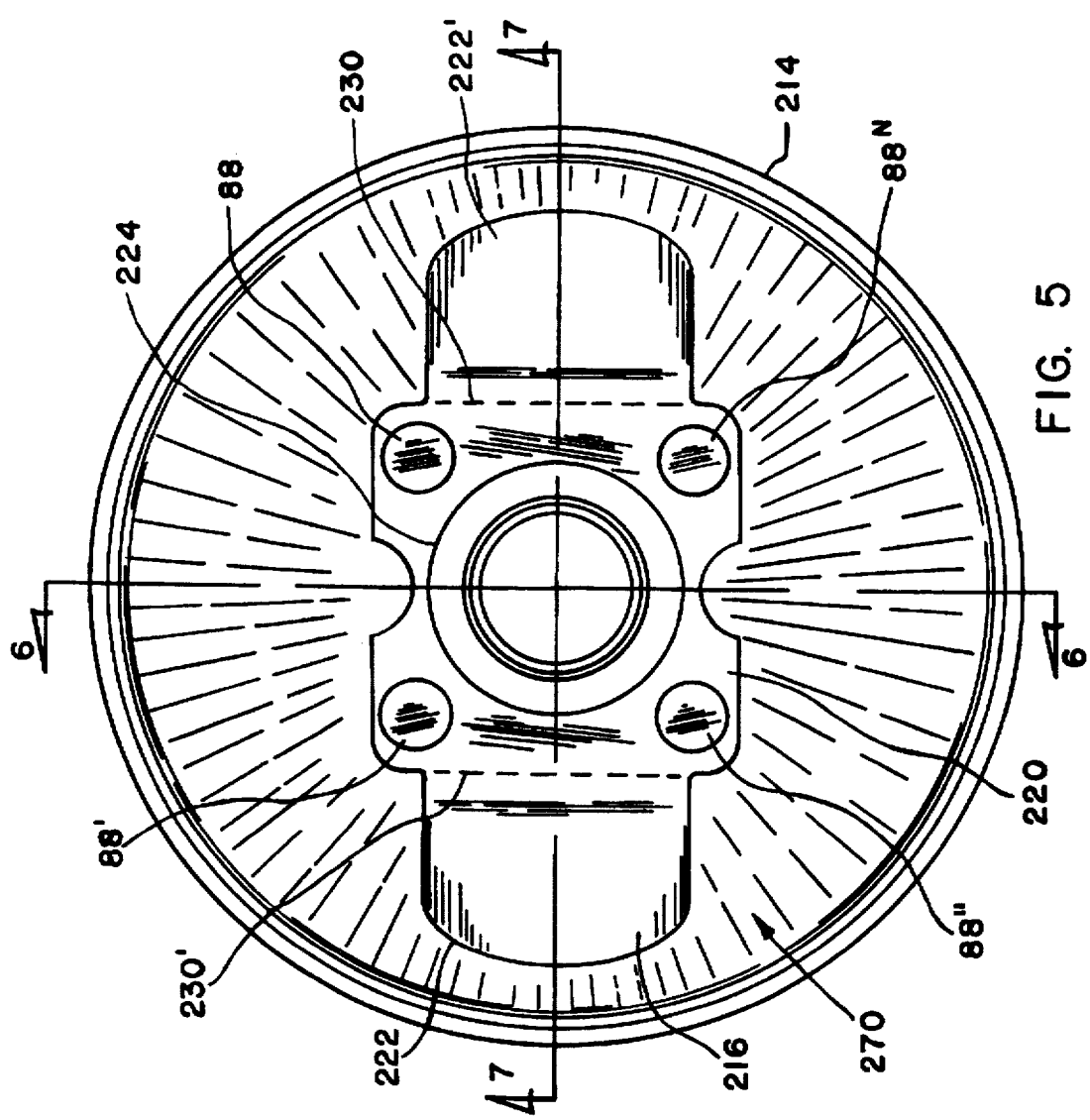

3
VACUUM BRAKE BOOSTER

This is a Continuation-in-Part of copending application Ser. No. 08/753,071 filed Nov. 20, 1996.

This invention relates to structure for the attenuation of sounds developed in a vacuum brake booster as a result of the communication of air into a rear chamber during the development of a pressure differential that produces an output force to effect a brake application corresponding to an input force applied by an operator and the evacuation of air out of the front chamber as the pressure differential is eliminated on termination of the input force by an operator.

BACKGROUND OF THE INVENTION

Attempts have been made to reduce or mask noise generated by the various components in a brake system during a brake application. It is normal for the power assist member to be located on the firewall of a vehicle which separates the engine compartment from the passenger compartment. When a power assist member of the type that utilizes atmosphere and vacuum as the power provides such assist, it is possible for the passenger to hear sounds created by air entering the power chamber of the power assist member and to hear the sound of air being evacuated from the power chamber when the vacuum brake booster returns to a rest condition. The sounds are created through the turbulent action of air as it is sucked into the power chamber to replace a vacuum fluid pressure that is normally found in the power chamber when the power assist member is in the rest condition. The sounds or air noise is caused by turbulence occurs as the air passes over and through the valve components and openings and finally expands into the power chamber. Several prior art patents including U.S. Pat. Nos. 5,249,505 which relates to structure for directing air through the valve body without turbulence and U.S. Pat. Nos. 4,598,625 and 4,716,814, U.S. patent application Ser. No. 08/360,782 and French Patent A-2,516,880 which relate to valve constructions, attenuates the development of sounds caused by air that is communicated into the rear chamber of a vacuum booster during a brake application. The valve structure disclosed in the prior art while reducing sounds produced during a brake application does not address the reduction in the transmission of sound created in the rear or power chambers where the majority of noise occurs nor creation of sounds from the front chamber as air is evacuated out of the rear chamber after a brake application.

SUMMARY OF THE INVENTION

The present invention address the attenuation of sounds actually produced in the front (first) and rear (second) chambers of a vacuum brake booster and attenuates such sounds by selectively positioning sound absorbing (dampening) members on the front (first) and rear (second) shells which form the housing for the brake booster. In this vacuum brake booster, the interior of the housing is separated into a first chamber and a second chamber by a wall member. The first and second chambers are in communication with a first source of fluid having a first fluid pressure (vacuum) in a first mode of operation while the second chamber alone is in communication with a second source of fluid at a second fluid pressure (air at atmospheric pressure) in a second mode of operation. A control valve retained in a bore of the wall member, responds to an operator input to develop the second mode of operation such that a pressure differential across is created across the wall member and as a result an output force corresponding to the input force is created to supply an output force corresponding with a desired braking application. To attenuate the development of air sounds created by air on entering the second chamber, a first sound absorbing member is affixed to the rear shell. This first sound absorbing member consists of a first metal disc or plate with a non-reticulated foam membrane member bonded thereto. Mounting bolts secured to the rear (second) shell engage the plate to compress the non-reticulated foam membrane member and resiliently urged the non-reticulated foam membrane member into engagement with the rear (second) shell. The first metal disc or plate vibrates as a result of the air turbulence developed in the second chamber as air is communication into the second chamber to raise the fluid pressure therein from the first pressure to the second pressure. The frequency of the sounds from the second chamber is changed by the vibration of the first metal disc or plate as it passes through an adhesive layer or retained non-reticulated foam membrane member and into the rear (second) shell such that essentially no sound is heard outside of the housing of the vacuum brake booster. Similarly, a sound absorbing member consisting of a second metal disc or plate with a non-reticulated foam membrane member bonded thereto is positioned against the front (first) shell, the second metal disc or plate vibrates as a result of sound frequency created by air being evacuated from the rear (second) chamber passes through the front (first) chamber and out of the front chamber by the first source of fluid (vacuum). The frequency of this sound is changed by the vibration of the second metal disc or plate as it passes through an adhesive layer or non-reticulated foam membrane member and into the front (first) shell such that essentially no sound is heard outside of the housing of the vacuum brake booster.

It is an object of this invention to provide a vacuum brake booster with sound absorbing members selectively bonded or compressed against the front and rear shells to attenuate the transmission of sounds from a front chamber and a rear chamber to outside of the housing formed by the front and rear shells.

It is a further object of this invention to provide a vacuum brake booster with a metal disc or plate selective bonded to an interior surface of a shell to attenuate the communication of sounds outside of a chamber wherein the sounds are created.

An advantage of this invention occurs through the use of a non-structural metal disc or plate which is selectively bonded to a surface to absorb sounds created by air turbulence as air which is communicated both to and from a chamber.

It is a further object of this invention to provide a vacuum brake booster with a metal plate with a non-reticulated foam membrane bonded thereto which is compressed and resiliently urged into engagement with an interior surface of a shell to attenuate and dampen the communication of sounds outside of a chamber wherein the sounds are created.

An advantage of this invention occurs through the use of a non-structural metal disc or plate which compresses a non-reticulated foam membrane against a surface to absorb sounds created by air turbulence as air which is communicated both to and from a chamber.

These objects and advantages will become apparent from reading this specification while view the drawings.

BRIEF DESCRIPTION OF THE DRAWINGS

FIG. 1 is a partial sectional view of a vacuum brake booster having a sound absorbing member selectively attached thereto in accordance with the present invention;

FIG. 2 is a view taken along line 2—2 of FIG. 1 showing the sound absorbing member;

FIG. 3 is a comparison showing the communication of sound from the vacuum brake booster of FIG. 1 with a standard vacuum brake booster;

FIG. 4 is a view of a secondary sound absorbing member for use in a vacuum brake booster;

FIG. 5 is an end view of a rear shell for a vacuum booster with a sound absorbing member compressed against the rear shell through a plurality of mounting bolts;

FIG. 6 is a sectional view taken along lines 6—6 of FIG. 5;

DETAILED DESCRIPTION OF THE INVENTION

Figure 8:
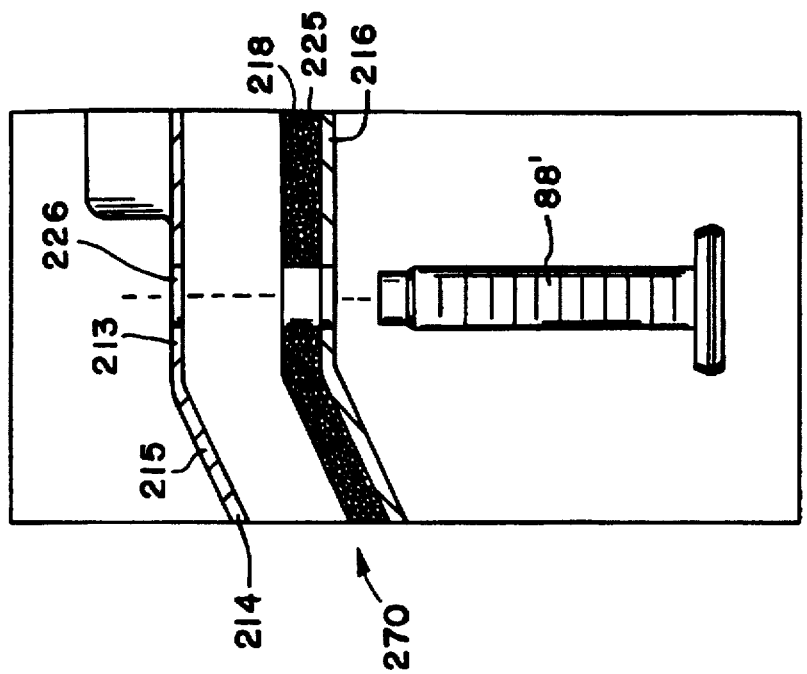
FIG. 8 is an enlarged sectional view taken along lines 8—8 of FIG. 7 illustrating showing the non-reticulated foam membrane in an expanded condition prior to being compressed by securing mounting bolts to the rear shell.

The vacuum brake booster 10 shown in FIG. 1 is designed to be connected to a master cylinder in a brake system to assist in providing an input force required to operate the master cylinder and effect a brake application in response to an operational braking request. The vacuum brake booster 10 is designed to be located on a firewall of a vehicle which separates the engine compartment from the passenger compartment and connected to a brake pedal operated by an operator. To effecting a brake application, air from either the passenger compartment or the engine area is communicated to the vacuum brake booster to create a source of power for operating a master cylinder in a brake system. The power source is created as a result of a pressure differential developed across a wall arrangement which separates a front chamber from a rear chamber. As air enters the rear chamber, to replace a vacuum normally found therein, some air turbulence occurs such that a sound is created. The level of the sound is dependent on the speed of a braking application, i.e. a faster application may result in a greater level sound. The vacuum brake booster 10 made according to the present invention includes a sound absorbing structure to achieve a quiet and efficient operation while providing an immediate operational force to operated the master cylinder in response to the operator.

In more particular detail, brake booster 10 is of a type as disclosed in U.S. Pat. No. 4,953,446 wherein a front (first) shell 12 is joined to a rear (second) shell 14 by a twist lock arrangement 16 to define a housing. A wall arrangement 22 which included a radial disc 26, a central hub 24 and a diaphragm 60 divides the interior of the housing into a first chamber 18 and a second chamber 20. The diaphragm 60 which has a first bead 62 attached to the central hub 24 and a second bead 64 connected to the twist lock arrangement 16 such that the first chamber 18 is separated from the second chamber 20. The central hub 24 has an axial bore 30 with a passage 32 connected to the first chamber 18 and a passage 34 connected to the second chamber 20. A control valve 40 located in the axial bore 30 includes a poppet member 42 and a plunger 44 to control the communication of a first fluid (vacuum) in the first chamber 18 through the axial bore 30 to the second chamber 20 in a first mode of operation and in a second mode of operation to allow air from the surrounding environment and at atmospheric pressure to be communicated through bore 30 to the second chamber 20. The first chamber 18 which is connected to the intake manifold of the vehicle and when the engine is in operation, a first fluid pressure (vacuum) is always available through check valve 50 such that when an operator terminates the input force on the brake pedal, the control valve 40 returns to the first mode of operation and the first fluid (vacuum) in chamber 18 which has a lower fluid pressure than air evacuates air from chamber 20 by way of passage 34, bore 30 and passage 32 to bring the fluid pressure in the first 18 and second 20 chambers to essentially the same fluid pressure level. With the fluid pressure in chambers 18 and 20 substantially equal, a return spring 58 located in chamber 18 urges the wall assembly 22 to a rest position as shown in FIG. 1.

On initiating a brake application to develop the second mode of operation, air flows from the environment through bore 30 and into chamber 20 by way of and under the control of the control valve 40 while in the first mode of operation, air is evacuated out of chamber 18 through check valve 50. The sounds that develop when switching between the first and second modes of operation are attenuated by sound absorbing members 70, 70' which are selectively bonded to the front 12 and rear shell 14. The sound absorbing members 70, 70' attenuate the frequency level of the sounds generated by turbulent created by air flow in chambers 18 and 20.

Sound absorbing members 70 and 70' are made from the same identical material and only member 70 will be described in detail. Sound absorbing member 70 as best shown in FIG. 2 consists of a steel plate or disc 90 to which is bonded by a layer of adhesive 92 to the rear shell 14. Disc or steel plate 90 is not intended to be a load carrying member and as a result has a bending stiffness of approximately ten percent of the stiffness of both the front shell 12 and rear shell 14 such that its shape is easily shaped to conform to the surfaces of the front and rear shell. Disc 90 is relatively thin and as shown in FIGS. 2 has a thickness of between 0.40 mm. and 0.50 mm. while the layer of adhesive 92 has a thickness of 0.22 mm. and 0.28 mm. The adhesive is a strip of Avery Fastape 115 which was bonded to one side of the disc 90 and is equally bonded with the interior surface 15 on rear shell 14. The peripheral diameter of the disc 90 bonded to the rear shell 14 is selected to be between about one half and two-thirds the functional diameter of the housing of the vacuum brake booster as shown in FIG. 1 while and peripheral diameter of a disc of the sound absorbing member 70' for the front shell 12 is selected to extend to approximately the entire functional diameter of the housing. Neither of the absorbing members 70 and 70' are intended to carry a load but are designed to be free to vibrate within the housing. The mounting bolts 88, 88' for the rear shell 14 and bolts 89 for the front shell 12 can be used to assure that sound absorbing members 70 and 70' remain adjacent the rear shell 14 and front shell 12 should the bond of the adhesive layer 92 deteriorate after an extended period of time and temperature fluctuations.

For some applications, it may be desirable to modify the sound absorbing disc in a manner as shown in FIG. 4, to consists of two plates 91, 91' each of which would have an effective thickness of between 0.20 mm and 0.25 mm while the adhesive layers 93, 93' would have a thickness of adhesive is between 0.22 mm. and 0.28 mm. Thus, the resulting metal disc 91, 91' and adhesive layers 93, 93' will essentially have an equal thickness which is still of no significant reduction in space to effect the output of vacuum brake booster 10. When sound frequency is transmitted through the first disc 91 and into the first adhesive layer 93, a certain modification of the frequency occurs. Similarly on this modified frequency being transmitted through the second disc 91' and into the second adhesive layer 93', a further modification of the frequency occurs such that on being transmitted into shell 14 essentially no audible sound is perceived by a human being.

In order to substantiate the functional advantage of the invention, a vacuum brake booster 10 was installed on a test bench and as series of brake applications performed while taking a trace of the sounds produced. In FIG. 3 this base line trace is identified by curve 100. Thereafter, an identical vacuum brake booster 10 having a sound absorbing disc 90 which was affixed the rear shell as illustrated in FIG. 1, was tested in the same manner to develop a trace as illustrated by curve 102. During this test, essentially no audible sound was produced when the sound absorbing disc 90 was in place. From such test it is anticipated that the adhesive bond between the sound absorbing disc 90 and rear shell 14 would be maintained over an extended period of time even though a vacuum brake booster 10 would be required to perform over a temperature range of from 0 degrees Centigrade to above 120 degrees Centigrade.

In order to better control handling requirements for adhesive materials required in production manufacture of a vacuum brake booster 10, as described above with respect to FIG. 1 and to achieve a desired conduction conduit to overcome any surface irregularities that could prevent a total and uniform bond between components, a mechanical link was substituted for bonding. Further, reduce cost and the overall material needed to achieve the dampening of sound created through the communication of air to and from chamber 20 in a most efficient manner, the disc 70 was modified to form a sound absorbing means 270 as illustrated in FIG. 5.

From testing it was determined that a sound absorbing means 270 consists of a metal plate 216 with a non-reticulated foam membrane member 218 bonded thereto with an adhesive layer 225 would adequately dampen sound created during communication of air to and from chamber 20. The bonding of the non-reticulated foam membrane member 218 with the metal plate 216 occurs prior to and away from the production line for a vacuum brake booster to reduce the complexity of manufacturing. The non-reticulated foam membrane member 218 is compressed against a rear (second) shell 214 for a brake booster 10, as shown in FIG. 6, to define a mechanical link between metal plate 216 and rear (second) shell 214 even though some irregular surfaces may be present and yet the metal plate 216 sufficient has sufficient resiliency to assure that the mechanical link extends throughout the entire surface area of engagement, see FIG. 7.

Figure 7:
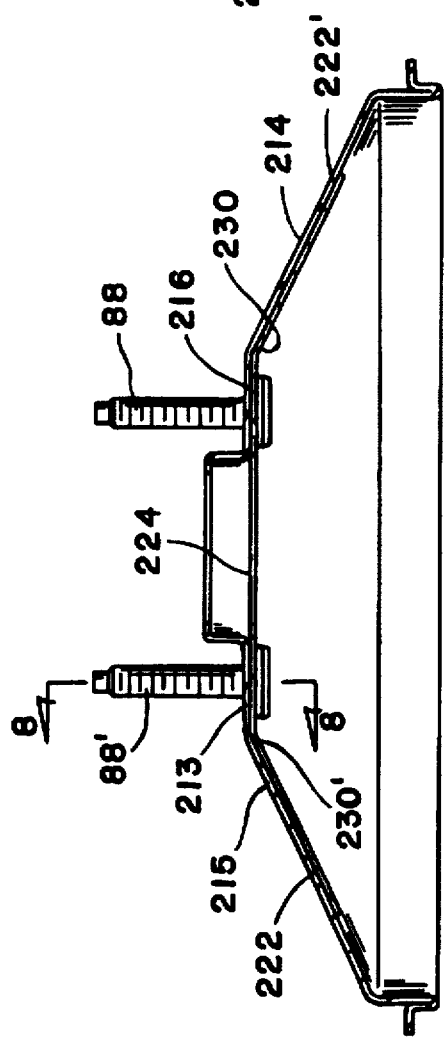
FIG. 7 is a sectional view taken along lines 7—7 of FIG. 5.

In more particular detail, metal plate 216 as best shown in FIGS. 5, 6, and 7 has a base 220 with a plurality (at least two) of projections 222, 222' which extends therefrom. The metal plate 216 has a central opening 224 with a plurality of openings 226 (only one is shown) which surround the central opening 224. The projections 222, 222' extend to a distance which is equivalent to approximately two-thirds the outside diameter of rear (second) shell 214. The non-reticulated foam membrane member 218 has a shape identical to metal plate 216 and was obtained from Stephenson & Lawyer, Inc. of Grand Rapids, Mich. The particular membrane member 218 tested was identified as low permeability foam "L" however many other flexible urethane foam materials may perform in a satisfactory manner. The metal plate 216 is relatively flat and thin with a thickness of between 0.40 mm. and 0.50 mm. while the non-reticulated foam membrane member 218 has a thickness of between 0.40 mm. and 0.50 mm. and the layer of adhesive has a thickness of 0.05 mm.

The layer of adhesive 225 is primarily used to assure that the non-reticulated foam membrane member 218 remains in a desired position substantially covering the metal plate 216 when the sound absorbing means 270 is secured to the rear shell 214 by mounting bolts 88, 88', . . . 88".

FIG. 8 provides illustrates the size of the non-reticulated foam membrane member 218 with respect to the metal plate 216 prior to the staking of the mounting bolts 88, 88' . . . 88" to the rear (second) shell 214. A force is applied to the base 220 of metal plate in conjunction with staking mounting to the rear (second) shell 214 causing metal plate 214 to bend approximately along dashed lines 230, 230'. When bolts or studs 88, 88' . . . 88" are fully staked, the non-reticulated foam membrane member 218 is compressed to conform to the shape of the rear (second) shell 214 including the cone shape 215 that extends from the mounting surface 213. From testing it has been determined in order for the non-reticulated foam membrane member 218 to function in a desired manner it should be compressed to a final thickness of 0.10–0.15 mm. in order to assure a mechanical bond is created over the entire engagement surface area of the rear (second) shell 214, see FIGS. 6 and 7.

It should be noted that the metal plate 216 has a coefficient of expansion compatible with rear (second) shell 214 but does not offer any sufficient stiffness thereto. However, it is important the first and second projections 222, 222' possess sufficient resiliency to hold the non-reticulated foam membrane member 218 against the rear shell 214 to assure that a mechanical bond is maintained therebetween.

Figure 9:
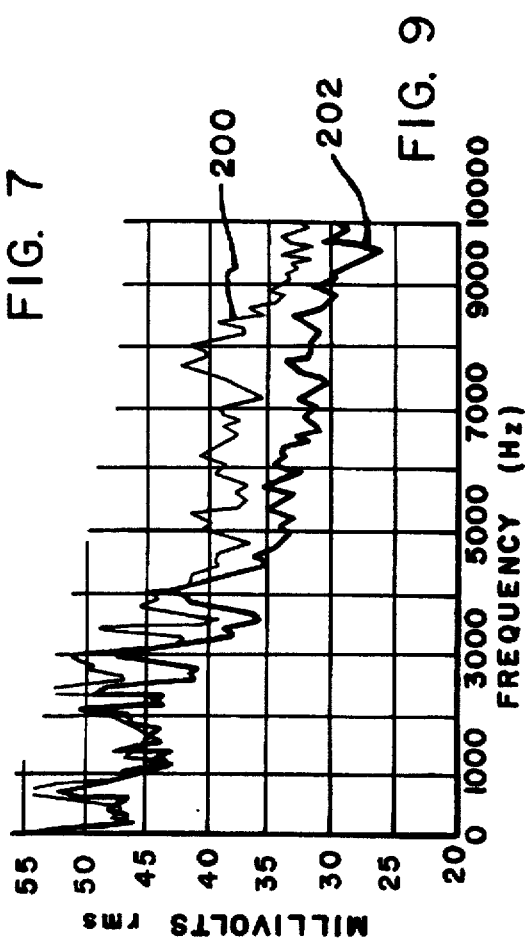
FIG. 9 is a comparison showing the communication of sound from a vacuum brake booster wherein a sound absorbing member is resiliently urged against a rear shell with a standard vacuum brake booster.

A brake booster was evaluated with a sound absorbing means 270 in accordance with the test procedure for the sound absorbing means 70. In FIG. 9 a base line trace defined by curve 200 illustrates noise or sounds created by a standard vacuum brake booster. While line trace defined by curve 202 illustrates sound or noise that was created when absorbing means 270 was affixed the rear (second) shell 214. During the testing it was observed and from the trace comparisons it should be evident that essentially no audible sound was created when the sound absorbing means 270 was resiliently compressed against the rear shell 214. During the functional operation of brake booster 10, sound when created in the rear (second) chamber 20 creates a first sound wave which causes the first plate 216 to vibrate at a second sound wave. This second sound wave is transmitted into the non-reticulated foam membrane member 218, while some of the second sound wave is absorbed in the non-reticulated foam membrane member 218 certain frequencies are transmitted therethrough and into the rear (second) shell 214 causing the rear (second ) shell 214 to vibrate at a third sound wave. The first, second and third sound waves each a plurality of resonant frequencies some of which mutually cancel each other such that substantially all audible recognition of sound by a human being is removed.

We claim:

1. In a brake booster having a first shell joined to a second shell to define a housing, said housing being separated into a first chamber and a second chamber by wall means, said first and second chambers in a first mode of operation being in communication with a first source of fluid having a first fluid pressure while in a second mode of operation said second chamber is in communication with a second source of fluid at a second fluid pressure such that a pressure differential is created across said wall means to produce an output force corresponding to an input force associated with a desired braking application, the improvement comprising: first sound absorbing means having a first disc affixed to said second shell by a first layer of adhesive, said first disc having a diameter in a ratio of about two-thirds of an outside diameter of said second shell, said first disc attenuating sounds created during communication of said second source of fluid to said second chamber to develop said pressure differential.

2. The brake booster as recited in claim 1 wherein said first disc has a thickness of between 0.40 mm. and 0.50 mm., said first disc being made of a metal material and having a coefficient of expansion compatible with said second shell but without offering any sufficient stiffness thereto.

3. The brake booster as recited in claim 2 wherein said first layer of adhesive is between 0.22 mm. and 0.28 mm.

4. The brake booster as recited in claim 1 wherein said first sound absorbing means further includes:

a second disc having a first side joined to said first disc through said first layer of adhesive; and a second layer of adhesive secured to a second side of said second disc, said second layer joining said second disc to said second shell.

5. The brake booster as recited in claim 4 wherein said first and second discs each have a thickness of between 0.20 mm and 0.25 mm.

6. The brake booster as recited in claim 4 wherein said first disc has a thickness of about 0.225 mm and said second disc has a thickness of about 0.225 mm.

7. The brake booster as recited in claim 1 wherein said first disc has a shape corresponding to said second shell with a center opening which surrounds a hub extension on said wall means and a plurality of openings adjacent said center opening, said second shell including a plurality of bolts that extend through said plurality of openings for mounting said second shell on a housing of a vehicle, said sound when created in said second chamber having a first sound wave which causes said first disc to vibrate at a second sound wave, said second sound wave being transmitted through said first adhesive layer and causing said second shell to vibrate at a third sound wave, said first, second and third sound waves having a plurality of resonant frequencies some of which mutually cancel each other such that substantially all audible recognition of said sound by a human being is removed.

8. The brake booster as recited in claim 1 wherein said first layer of adhesive retains its resiliency over a temperature range of from 0 degrees Centigrade to 120 degrees Centigrade.

9. The brake booster as recited in claim 1 further comprising:

second sound absorbing means affixed to said first shell for attenuating sounds created during an evacuation of said second source of fluid from said second chamber to eliminate said pressure differential and establish said first mode.

10. The brake booster as recited in claim 9 wherein said second sound absorbing means includes:

a third disc; and a third layer of adhesive for securing said third disc to said first shell.

11. The brake booster as recited in claim 10 wherein said third disc has a shape corresponding to said first shell with a center opening which surrounds a spring retainer and a plurality of openings adjacent said center opening, said first shell including a plurality of bolts that extend through said plurality of openings for mounting said first shell on a master cylinder of a vehicle, said sound when created in said first chamber having a fourth sound wave which causes said third disc to vibrate at a fifth sound wave, said fourth sound wave being transmitted through said third adhesive layer and causing said first shell to vibrate at a sixth sound wave, said fourth, fifth and sixth sound wave having a plurality of resonant frequencies some of which mutually cancel each other such that substantially all audible recognition of said sound by a human being is removed.

12. The brake booster as recited in claim 11 wherein said third disc has a peripheral diameter which is substantially equal to an effective diameter of said housing but does not significantly contribute to the flexure of said first shell.

13. The brake booster as recited in claim 12 wherein said third disc has a mean thickness of between 0.40 mm. and 0.50 mm., said third disc being made of a metal material and having a coefficient of expansion compatible with said first shell.

14. In a brake booster having a first shell joined to a second shell to define a housing, said housing being separated into a first chamber and a second chamber by wall means, said first and second chambers in a first mode of operation being in communication with a first source of fluid having a first fluid pressure while in a second mode of operation said second chamber is in communication with a second source of fluid at a second fluid pressure such that a pressure differential is created across said wall means to produce an output force corresponding to an input force associated with a desired braking application, the improvement comprising: dampening means having a first plate with a base and at least first and second projections extending therefrom, said base having a central opening with a plurality of openings surrounding said central opening, a membrane having a shape which matches said first plate, and a plurality of bolts which correspondingly extend through said plurality of openings in said first plate to affix said first plate to said second shell, said first and second projections extending from said base to a distance of approximately two-thirds of an outside diameter of said second shell, said base and first and second projection of said first disc compressing said membrane against said second shell such that said membrane attenuates sounds created during the communication of said second source of fluid with said second chamber.

15. In a brake booster as recited in claim 14 wherein said membrane has an initial thickness of between 0.40 mm. and 0.50 mm. which is compressed to a thickness of between 0.1 mm to 0.15; and said first plate is made of a metal material which has a coefficient of expansion compatible with said second shell but without offering any sufficient stiffness thereto while said first and second projections have sufficient resiliency to hold said membrane against said second shell.

16. The brake booster as recited in claim 14 further including a first layer of adhesive for securing said membrane to said first plate, said first layer of adhesive having a thickness of approximately 0.05 mm.

17. The brake booster as recited in claim 14 wherein said sound when created in said second chamber creates a first sound wave which causes said first plate to vibrate at a second sound wave, said second sound wave being transmitted into said membrane and causing said second shell to vibrate at a third sound wave, said first, second and third sound waves having a plurality of resonant frequencies some of which mutually cancel each other such that substantially all audible recognition of said sound by a human being is removed.

18. The brake booster as recited in claim 17 wherein membrane is a non-reticulated foam plastic material.

* * * * *